June 16, 1964   J. C. CURTIS ETAL   3,137,353
ROCK DRILL JIB AND DRILL FEED WITH PNEUMATIC STINGER BAR
Filed Oct. 31, 1958
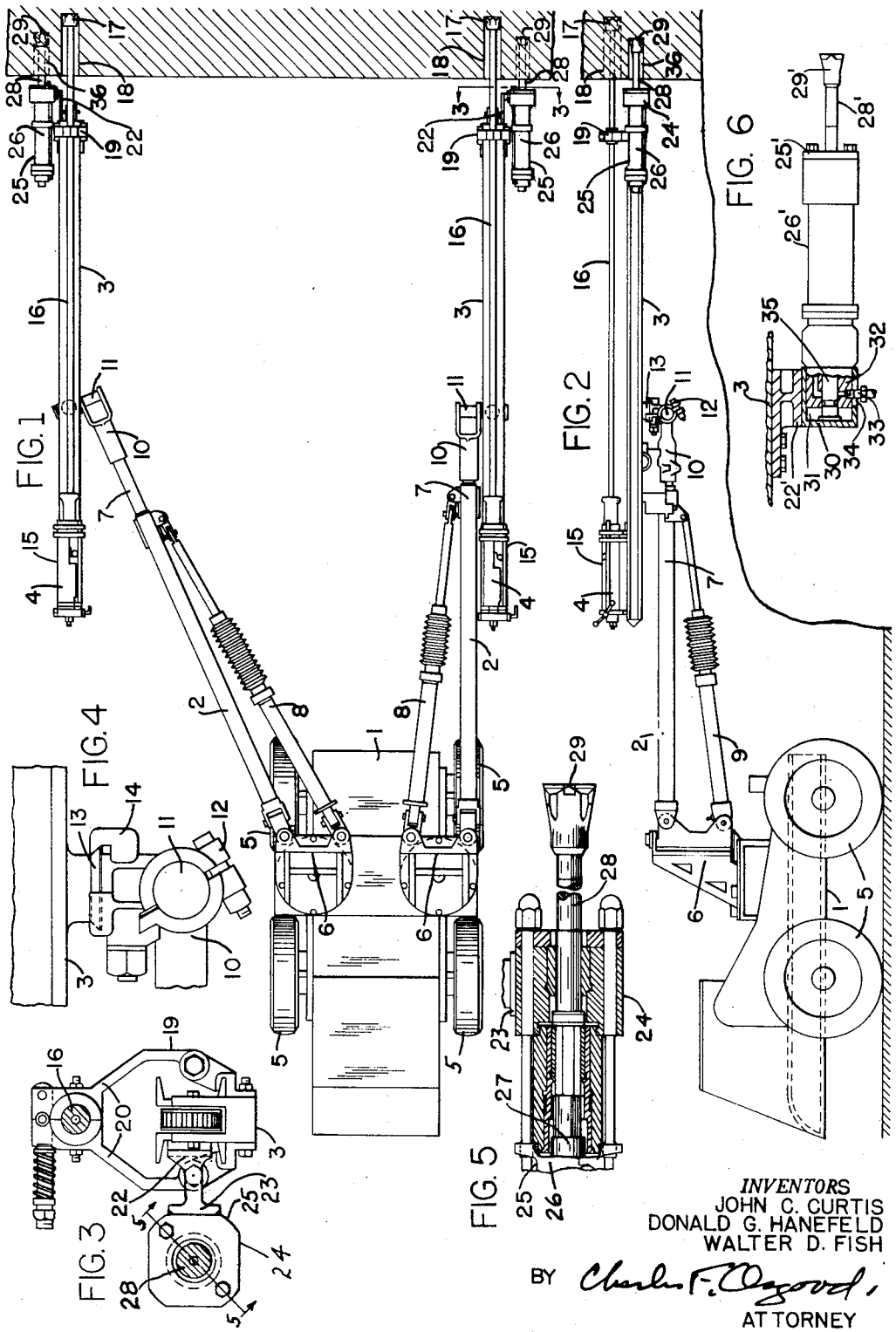
INVENTORS
JOHN C. CURTIS
DONALD G. HANEFELD
WALTER D. FISH
BY Charles F. Osgood,
ATTORNEY

United States Patent Office 3,137,353
Patented June 16, 1964

3,137,353
ROCK DRILL JIB AND DRILL FEED WITH PNEUMATIC STINGER BAR
John C. Curtis, Newport, N.H., Donald G. Hanefeld, South Berwick, Maine, and Walter D. Fish, Claremont, N.H., assignors to Joy Manufacturing Company, Pittsburgh, Pa., a corporation of Pennsylvania
Filed Oct. 31, 1958, Ser. No. 771,146
4 Claims. (Cl. 175—57)

This invention relates to rock drills and more particularly to a face engaging stinger bar for a rock drill jib for steadying the drill on the working face during the drilling operation.

In hammer rock drills the drilling tools are frequently mounted on supports such as guides carried by adjustable boom supports having swiveled joints, and it has been found under actual practice that the drill boom supports and guides tend to move laterally relative to the face during the drilling operation thereby failing to maintain the drilling tools in proper alignment with the holes being drilled. The present invention contemplates improvements over known types of adjustable drill boom supports in that a pneumatic stinger bar is mounted at the outer end of the drill guide frame for engaging the working face to hold the drill guide frame and its supporting boom steady during the drilling operation thereby to maintain the drilling tool in alignment with the hole being drilled.

An object of the present invention is to provide improved means for holding a drill guide carried by a swiveled drill boom support steady on the working face being drilled thereby to maintain the drilling tool in alignment with the hole being drilled. Another object is to provide an improved pneumatic stinger bar for a drill guide frame swivelly mounted on a swingable boom support. Yet another object is to provide a stinger bar support in the form of a hammer drilling device for drilling a relatively short hole at the working face whereby the drill steel of the drilling device serves as a stinger bar to provide a support for the outer end of the drill guide and drill supporting boom thereby to resist lateral deflection of the guide and boom during drilling. These and other objects and advantages of the invention will, however, hereinafter more fully appear in the course of the ensuing description.

In the accompanying drawing there are shown for purposes of illustration one form and a modification which the invention may assume in practice.

In this drawing:

FIG. 1 is a plan view and FIG. 2 is a side elevational view of a mobile rock drill rig of the dual boom type in which an illustrative form of the invention is incorporated, showing the stinger bars in engagement with the working face.

FIG. 3 is an enlarged cross setcion taken on line 3—3 of FIG. 1, showing the stinger bar and its mounting on the drill guide frame.

FIG. 4 is a fragmentary view showing the swivel between the drill jib and the drill guide frame.

FIG. 5 is a detail vertical section taken on line 5—5 of FIG. 3 showing the pneumatic hammer device for percussively actuating the drilling implement which provides the stinger bar.

FIG. 6 is a detail view partially in horizontal section showing a modified self-starting stinger bar motor.

The rock drill or so-called mobile drill rig may be of the "Joy Drillmobile" type comprising a mobile base 1 having a pair of boomlike frames or supporting jibs 2 swivelly mounted thereon and carrying guide frames 3 for pneumatic hammer drilling tools 4. The mobile base is desirably mounted on rubber tired wheels 5 for propelling and steering the machine. Evidently instead of a pair of drill supporting jibs one jib or more than two may be employed.

Each drill supporting jib may be of the "Joy Hydro-Jib" type similar to that disclosed in Patent No. 2,791,399, dated May 7, 1957, assigned to the same assignee as the present invention, comprising an upstanding support 6 mounted on the forward portion of the base frame and an elongated boomlike frame or jib 7 pivotally mounted on this support to swing in vertical and horizontal planes with respect to the base. Hydraulic jacks 8 and 9 are operatively connected between the support 6 and the boom frame for swinging the latter vertically and horizontally and for holding the same in adjusted position. The outer end of the boom frame carries a rotatable support 10 adjustable about the longitudinal axis of the boom frame and adapted to be clamped in adjusted position, and this rotatable support carries a transverse bar 11 to which a securing device such as a clamp 12 may be adjustably secured. The elongated drill guide frame or drill feed frame 3 has a usual swivelled plate or trunnion 13 secured as by a clamp 14 carried by the body of the bar clamp 12, as shown in FIG. 4. The hammer drilling tool 4 is guided for rectilinear movement back and forth along the guide frame and comprises a conventional pneumatic hammer motor 15 for percussively actuating a drilling implement or drill steel 16 carrying a drill bit 17 at its outer end for drilling blast holes 18 in the working face. A conventional drill steel centralizer 19 has pivoted centralizer arms 20 for embracing the drill steel for maintaining the drill bit centered during starting of the blast hole, in a well-known manner. Any suitable power feeding means, such as a motor driven chain feed disclosed in Patent No. 2,338,625, dated January 4, 1944, of common ownership, may be employed for feeding the drilling tool. The above drill structure is well-known and therefore a more detailed description thereof would seem unnecessary.

Now referring to the improved pneumatic stinger bar device it will be noted that secured to one side of the outer portion of each drill guide frame is a lateral bracket 22 having a front portion 23 engaging the inner portion of the chuck housing 24 of a pneumatic hammer device 25. This hammer device extends rearwardly along one side of the guide frame and has a motor cylinder 26 containing a reciprocable hammer piston 27 (FIG. 5) for percussively actuating a relatively short drilling implement or drill steel 28 carrying a drill bit 29. The pneumatic hammer device is of a conventional design known to the trade as the "Joy L-37" type drill and, as later described, may be self-starting when placed against the work as disclosed in Patent No. 2,001,746, dated May 21, 1935, of common ownership. In the event this latter tool is employed, support would be by the rear head, as shown in FIG. 6, instead of at the front end. If desired, a conventional remote control may be provided for controlling the pressure fluid supply to this hammer device, in a wellknown manner. The hammer device 25 may be advanced toward the work during drilling by advancing the drill guide frame but if desired separate feeding means may be provided for each hammer device, in a well-known manner.

The modified self-starting hammer tool shown in FIG. 6 comprises a rear head 30 secured to a lateral bracket 22' secured to a drill guide frame 3. This rear head has a bore 31 extending longitudinally of the guide frame and reciprocably retained in the bore is a cylindrical block 32 secured to the cylinder 26' of the pneumatic hammer stinger device 25'. As in the embodiment above described, the motor cylinder contains a reciprocable hammer piston for percussively actuating a drill steel 28' carrying a drill bit 29'. Pressure fluid may be supplied to the motor cylinder to effect piston reciprocation through a supply hose connection 33 passing through a longitudinal slot 34 in the rear head 30. The connection 33 cooperates with the slot 34 to limit the longitudinal relative movement between the rear head 30 and block 32. A conventional control valve 35 is held against the rear head under the action of pressure fluid and normally cuts off the supply of fluid to the hammer motor. When the drill bit 29' is brought up against the work and the guide frame 3 is advanced toward the work the rear head 30 slides forwardly relative to the cylindrical block 32 to move the control valve 35 to open position thereby automatically to start the hammer device to effect drilling of the hole in the working face. When the guide frame is again held stationary with respect to the work the hammer motor continues to run until the drill bit deepens the hole sufficiently to cause forward movement of the cylindrical block 32 under the action of pressure fluid relative to the rear head block, to cause the supply of pressure fluid to the motor to be automatically cut off to stop the motor.

The mobile drill rig above described may operate in the following manner. When the mobile base has been brought up near the working face, as shown in FIGS. 1 and 2, the hydraulic jacks 8 and 9 may be operated to swing the drill supporting booms 2 to locate the guide frames 3 for the drilling tools 4 in the desired positions with respect to the working face. At this time the drilling tools 4 may be retracted on their respective guide frames with the drill bits 17 located back from the working face, and the drill steels 28 of the stinger bar devices may be located with their drill bits up against the face. Thus when the base is advanced toward the work the drill steels 28 may be fed toward the work to effect drilling of holes 36. Thus relatively short holes are drilled into the face so that the drill steels 28 provide stinger bar supports for the outer ends of the drill supporting frames on the working face thereby to steady the drill guide frames and to prevent lateral deflection of the drill supporting booms or jibs during the drilling operation thereby to keep the drilling tools in alignment with the holes being drilled. These stinger bar supports not only hold the drill guide frames laterally in relation to the face being drilled but also prevent the drill guide frames from pivoting on the boom support thereby throwing the feed out of line with the hole being drilled. The stinger bar supports also prevent lateral deflection of the booms and keep the drilling pressure from sliding the whole machine base on its rubber tires laterally over the floor.

When the self-starting hammer devices, as shown in FIG. 6, are employed the guide frames may be advanced toward the work and, when the drill bits 29' contact and are resisted by the working face, the hammer motors are automatically started by the opening of the control valves 35. As the drill steels penetrate the work to the desired depth advance of the guide frames is discontinued and as the guide frames remain stationary the hammer motors continue to operate until they are automatically stopped by movement of the cylindrical blocks 32 forwardly relative to the rear supporting heads 30 to move the control valves 35 to their closed positions. Otherwise the mode of operation of this modified embodiment is similar to that above described.

As a result of this invention improved means is provided for holding the outer end of a drill supporting guide and supporting boom of the drill rig in position with respect to the work thereby to avoid lateral deflection of the drill support as a result of the percussive action set up by the drilling tools during the drilling operation. By the provision of the pneumatic stinger hammer motor at the outer portion of the drill guide frame a relatively short hole may be drilled in the working face so that the relatively short drill steel may act as a stinger bar to maintain the drill guide frame and drill jib steady with respect to the work. By utilizing the relatively short drill steel of the hammer stinger device as a stinger bar the outer end of the drill guide frame and its boom support are firmly held against lateral deflection with respect to the work thereby to hold the feed in line with the hole. The provision of the self-starting stinger bar motors results in automatic starting and stopping of the hammer tools. These and other advantages of the invention will, however, be clearly apparent to those skilled in the art.

While there are in this application specifically described one form and a modification which the invention may assume in practice, it will be understood that this form of the same is shown for purposes of illustration and that the invention may be further modified and embodied in various other forms without departing from its spirit or the scope of the appended claims.

What we claim as new and desire to secure by Letters Patent is:

1. In a drilling apparatus comprising a mobile base, an elongated swingable boom-like frame swivelly mounted at one end on said base, an elongated drill guide frame adjustably secured to the other end of said boom-like frame, a power operated drilling device mounted on said drill guide frame and having a drilling implement thereon, means mounted on said guide frame for moving and guiding said drilling device along said guide frame toward and from the work, another power operated drilling device fixed to the outer end of said drill guide frame at one side of the latter and parallel to the longitudinal axis of said first mentioned drilling device, said another drilling device having a drilling implement thereon extending longitudinally outwardly beyond the outer end of said guide frame and operative upon movement of said guide frame toward the work to feed the drilling implement into the work to form a first drill hole in the work, said drilling implement of said another drilling device upon completion of said hole while still attached to said another drilling device remaining in said hole to provide by its engagement with the walls thereof means to prevent lateral movement of said guide frame and said mobile base with respect to the face of the work during operation of said first mentioned drilling device in the formation of a second drill hole in the work after the formation of said first drill hole in the work by said another drilling device.

2. A method of drilling comprising, positioning a mobile drilling apparatus in an approximate drilling position, positioning an articulated boom mounted on said drilling apparatus and which boom carries a guide frame having a plurality of power operated drilling tools supportably mounted on said guide frame into a drilling position relative to said drilling apparatus and the work to be drilled, advancing said drilling apparatus and the boom and guide frame thereon until the one of said drilling tools which is fixedly secured to the forward end of said guide frame and extending in advance thereof contacts the work, actuating said one of said drilling tools to form a drill hole and thereafter remaining in the hole drilled thereby, forming by the other power operated drilling tool which is slidably mounted on the guide frame another hole of greater length in the work by advancing the latter drilling tool relative to said guide frame and actuating said latter drilling tool, said maintenance of the drilling tool which is fixed to the guide frame in the hole drilled thereby during the drilling operation by the drilling tool which is advanced along the guide frame preventing lateral displacement of the drilling apparatus relative to the face of the work to thus maintain the hole drilled by the drilling tool which is movable along the guide frame in parallelism with the hole drilled by the drilling tool fixedly secured to the guide frame.

3. In a rock drilling machine, a guide frame providing a guideway extending lengthwise thereof, means for supporting said guide frame with one end thereof contiguous to a working face, a drilling tool mounted on the forward portion of said guide frame for drilling a short hole in the face whereby the tool may remain in said hole to position said guide frame with respect to the face and a drilling tool guided for movement along said guideway of said guide frame for drilling a hole in the face parallel with said short hole, said first mentioned tool by its engagement with the walls of said short hole preventing lateral movement of said second mentioned tool relative to the face as said second mentioned hole is started in the face, a control means for said first mentioned tool whereby when said guide frame is brought up in contiguity with the face said first mentioned tool is automatically started, said control means comprising a cylindrical block member secured to the rearward end of said first mentioned drilling tool, a rear head member provided with a cylindrical bore for slidably receiving said block member and mounted on said guide frame, a control valve slidably carried by said block member and extending rearwardly therefrom for engagement with said rear head member, and means on said control valve providing a passageway for connecting said cylindrical bore with a source of operating fluid to actuate said block member and thereby said first mentioned drilling tool upon forward movement of said control valve relative to said block member.

4. In a rock drilling machine, a guide frame providing a guideway extending lengthwise thereof, means for supporting and for advancing said guide frame with one end thereof contiguous to a working face, a power operated drilling tool fixedly secured to the forward portion of said guide frame at one side thereof and having a drilling implement extending forwardly in advance of said guide frame for drilling a short hole in the face whereby the drilling implement after the drilling operation may remain in said hole to position and maintain said guide frame with respect to the face, and a power operated drilling tool mounted on said guide frame and guided for movement along said guideway of said guide frame for drilling a hole in the face parallel with said short hole, said drilling implement of said first mentioned tool by its engagement with the walls of said short hole preventing lateral movement of said second mentioned tool relative to the face as said second mentioned hole is started in the face, said power operated drilling tools being mounted in parallelism on said guide frame but located on said guide frame in different horizontal planes, said guide frame having a lateral bracket secured to the outer end of said guide frame, said bracket extending forwardly in advance of said guide frame and said first mentioned drilling tool being secured to the forward end of said lateral bracket.

References Cited in the file of this patent
UNITED STATES PATENTS

| | | |
|---|---|---|
| 120,836 | Taylor | Nov. 14, 1871 |
| 683,628 | Wantling | Oct. 1, 1901 |
| 1,519,981 | Mott | Dec. 16, 1924 |
| 1,632,400 | Gilman | June 14, 1927 |
| 1,679,139 | Gartin | July 31, 1928 |
| 1,755,255 | Griffith | Apr. 22, 1930 |
| 1,761,337 | Hall | June 3, 1930 |
| 2,001,746 | Reilly | May 21, 1935 |
| 2,302,073 | Tracy | Nov. 17, 1942 |
| 2,306,040 | Curtis | Dec. 22, 1942 |
| 2,338,625 | Curtis | Jan. 4, 1944 |
| 2,389,553 | Sellars | Nov. 20, 1945 |
| 2,791,399 | Curtis et al. | May 7, 1957 |